(12) United States Patent
Han et al.

(10) Patent No.: US 11,598,905 B2
(45) Date of Patent: Mar. 7, 2023

(54) INVERTED NANOCONE STRUCTURE FOR OPTICAL DEVICE AND METHOD OF PRODUCING THE SAME

(71) Applicant: KOREA INSTITUTE OF SCIENCE AND TECHNOLOGY, Seoul (KR)

(72) Inventors: Sang Wook Han, Seoul (KR); Seung Woo Jeon, Seoul (KR); Sung Wook Moon, Seoul (KR); Yong Su Kim, Seoul (KR); Hyang Tag Lim, Seoul (KR); Ho Joong Jung, Seoul (KR); Young Wook Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 280 days.

(21) Appl. No.: 16/897,024

(22) Filed: Jun. 9, 2020

(65) Prior Publication Data
US 2021/0293999 A1 Sep. 23, 2021

(30) Foreign Application Priority Data
Mar. 19, 2020 (KR) .................. 10-2020-0033552

(51) Int. Cl.
*G02B 3/00* (2006.01)
*C09K 11/65* (2006.01)
*B82Y 40/00* (2011.01)
*B82Y 20/00* (2011.01)
*B82Y 30/00* (2011.01)

(52) U.S. Cl.
CPC ............ *G02B 3/0025* (2013.01); *C09K 11/65* (2013.01); *G02B 3/0043* (2013.01); *B82Y 20/00* (2013.01); *B82Y 30/00* (2013.01); *B82Y 40/00* (2013.01); *G02B 2003/0093* (2013.01); *G02B 2207/101* (2013.01)

(58) Field of Classification Search
CPC .... G02B 3/0025; G02B 3/0043; G02B 1/005; G02B 1/02; G02B 2003/0093; C09K 11/05; B82Y 20/00
USPC ........................................... 359/652
See application file for complete search history.

(56) References Cited

U.S. PATENT DOCUMENTS

2014/0043611 A1\* 2/2014 Narashimhan ............ G01J 1/42
356/402

OTHER PUBLICATIONS

Ettore Bernardi et al., "Nanoscale Sensing Using Point Defects in Single-Crystal Diamond: Recent Progress on Nitrogen Vacancy Center-Based Sensors, Apr. 28, 2017".
Sebastian W. Schmitt et al., "Observation of strongly enhanced photoluminescence from inverted cone-shaped silicon nanostructures, Nov. 26, 2015".

\* cited by examiner

*Primary Examiner* — Thinh T Nguyen
(74) *Attorney, Agent, or Firm* — Rabin & Berdo, P.C.

(57) ABSTRACT

An inverted nanocone structure of the present disclosure includes a first surface, a second surface spaced apart from the first surface by a predetermined distance and having a greater area than the first surface, and a body having an inverted cone shape between the first surface and the second surface, wherein at least one activated point defect center is provided in the body.

5 Claims, 12 Drawing Sheets
(10 of 12 Drawing Sheet(s) Filed in Color)

Integration with other optical devices

High-quality single-photon light source made of diamond can be integrated into heterogeneous optical system.

INVERTED NANOCONE STRUCTURE FOR OPTICAL DEVICE AND METHOD OF PRODUCING THE SAME

CROSS-REFERENCE TO RELATED APPLICATION

This application claims priority to and the benefit of Korean Patent Application No. 2020-0033552, filed on Mar. 19, 2020, the disclosure of which is incorporated herein by reference in its entirety.

BACKGROUND

1. Field of the Invention

The present disclosure relates to an inverted nanocone structure used in an optical device, and more particularly, to an inverted nanocone structure that can be used as a single-photon light source and a method of producing the same.

2. Discussion of Related Art

A bright and stable single-photon light source is one essential element for realizing quantum information communication technology such as quantum computing, quantum communication, and quantum cryptography.

Due to the development of semiconductor process technology, many results have been produced in the study on the development of a solid-state single-photon light source element such as quantum dots, atomic defects, and two-dimensional (2D) materials. A solid-state light source may be made in the desired place and may be combined with other optical elements such as a waveguide or a resonator, thereby improving the performance of the light source element, and also being applicable to a photonic integrated device. In particular, solid point defects in diamond represented by nitrogen vacancies may operate stably as a single-photon light source even at room temperature, and above all, have a characteristic that the spin coherence time is very long, and thus have been spotlighted due to great potential for quantum applications such as quantum computing and quantum sensors. Recently, there have been reported point defects that may be used as a single-photon light source even in materials having a wide energy band gap such as silicon carbide and zinc oxide.

However, in a quantum light source based on the point defects, studies for increasing light trapping efficiency have been somewhat stagnant compared to other solid-state quantum light sources. This is because it is difficult to produce a structure for increasing light trapping efficiency due to the robustness of a material itself having a wide energy bandgap. In particular, diamond is physically and chemically very robust, and accordingly, it is a highly challenging task to process such a material to produce a structure increasing the light trapping efficiency.

In order to solve this, methods of producing nanostructures using different materials such as silicon, which are relatively easy to process, and introducing the nanostructures onto a substrate including point defects are mainly used. However, when the external structure is used, there should be point defects near the surface of the material, and thus optical and quantum characteristics of the point defects may be deteriorated due to surface strain. Accordingly, in order to solve the problem, directly processing materials to produce nanostructures is an ultimate solution. In order to efficiently trap light by producing nanostructures, a method of guiding photons generated from point defects in the direction of trapping photons is mainly used. Representative structures for this include a nanowire, a nanopillar, a waveguide, a bullseye grating, a solid immersion lens, and the like, which are relatively simple to produce. However, when these structures are produced on the surface of a material, there is a fundamental limitation in that it is possible to trap only up to 50% of photons emitted from a light source in any direction due to the structural characteristics.

Further, the nanostructures have a disadvantage in that a spin coherence time is reduced because of noise due to surface strain and surface defect level. In addition, these nanostructures may not be separated from the substrate, and accordingly, it is difficult to integrate with other optical elements for implementing a system applicable to the field of quantum computing and quantum communication, and thus the application to the field of application has been limited.

SUMMARY OF THE INVENTION

The present disclosure is directed to proposing a novel nanostructure applicable to an optical device.

The present disclosure is also directed to providing an inverted diamond nanocone structure having high photon trapping efficiency in a nitrogen vacancy.

Other details of the present disclosure are included in the following detailed description and the drawings.

According to an aspect of the present disclosure, there is provided an inverted nanocone structure used in an optical device including a first surface, a second surface spaced apart from the first surface by a predetermined distance and having a greater area than the first surface, and a body having an inverted cone shape between the first surface and the second surface, wherein at least one activated point defect center is provided in the body.

A material (energy bandgap) of the body may include diamond (5.5 eV), SiC (3.2 eV), GaN (3.45 eV), or ZnO (3.3 eV), and the point defect center may include a nitrogen-vacancy center or a silicon-vacancy center.

The first surface may have a diameter of 20 nm to 100 nm.

According to another aspect of the present disclosure, there is provided an optical element including an inverted nanocone structure as a light source.

The inverted nanocone structure may include a first surface, a second surface spaced apart from the first surface by a predetermined distance and having a greater area than the first surface, and a body having an inverted cone shape between the first surface and the second surface, and at least one activated point defect center may be provided in the body.

According to still another aspect of the present disclosure, there is provided a method of producing an inverted nanocone structure, including preparing a base material, forming a nitrogen vacancy by injecting nitrogen ions into the base material and annealing the base material, forming a nanostructure having a cylindrical shape by patterning a mask in a circular shape and using an anisotropic etching process, and forming an inverted nanocone structure by etching a first surface of the cylindrical shape, which is in contact with the base material, more than a second surface, which is an upper portion of the cylindrical shape.

In the forming of the inverted nanocone structure, dry etching may be performed using a Faraday cage for producing an inverted nanocone structure, and the Faraday cage may include an upper open part and a lower open part disposed on an upper portion and a lower portion thereof, respectively, may have a cone shape, in which the lower open part has a greater area than the upper open part, with a predetermined thickness, and may include a perimeter in which a plurality of holes are arranged.

The method may further include selecting an inverted nanocone structure in which at least one activated nitrogen vacancy exists in the inverted nanocone structure.

The method may further include separating the produced inverted nanocone structure from the diamond base material and disposing the inverted nanocone structure in an optical element structure.

It should be noted that the present specification is not limited to the above-described aspects, and other aspects that are not described herein will be apparent to those skilled in the art from the following descriptions.

Advantageous Effects

According to the present specification, a novel inverted nanocone structure that can be used in an optical device is provided.

The effect of the present disclosure is to provide an inverted diamond nanocone structure having high photon trapping efficiency in a nitrogen vacancy (NV) center.

It should be noted that the advantageous effects of the present disclosure are not limited to the above-described effects, and other effects that are not described herein will be apparent to those skilled in the art from the following descriptions.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and implementation methods thereof disclosed herein will be clarified through the following embodiments described with reference to the accompanying drawings. However, the present disclosure is not limited to the embodiments described below and may be embodied with a variety of different modifications. The present embodiments are merely provided to allow one of ordinary skill in the art to completely understand the scope of the present disclosure, and the scope of the present disclosure is only defined by the scope of the claims.

Hereinafter, embodiments of the present disclosure will be described in detail with reference to the accompanying drawings.

Figure 1A:
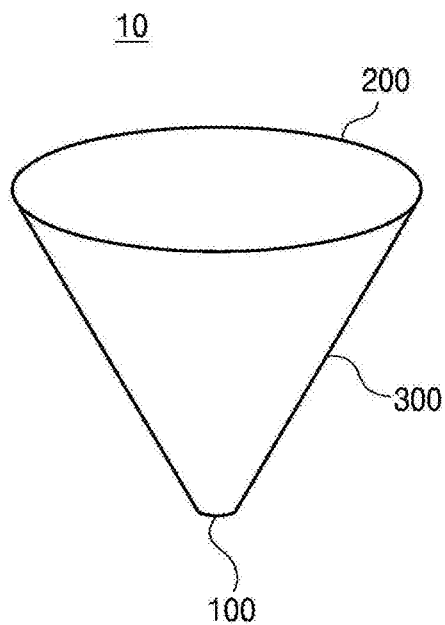
FIG. 1A is a perspective view of an inverted nanocone structure according to one embodiment of the present disclosure.
Figure 1B:
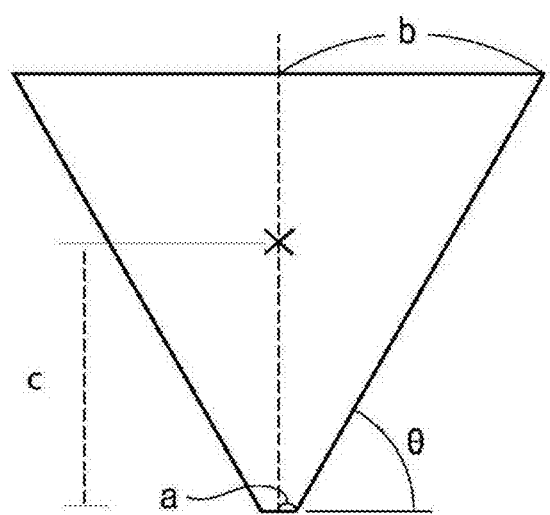
FIG. 1B is a side view of the inverted nanocone structure in FIG. 1A.

FIG. 1A is a perspective view of an inverted nanocone structure according to one embodiment of the present disclosure, and FIG. 1B is a side view of the inverted nanocone structure in FIG. 1A.

An inverted nanocone structure 10 includes a first surface 100, a second surface 200, and a body 300, which has an inverted cone shape, is between the first surface 100 and the second surface 200, and is made of diamond. The second surface 200 is spaced apart from the first surface 100 by a predetermined distance and has a greater area than the first surface 100.

Meanwhile, at least one activated point defect center exists inside the body 300 of the inverted nanocone structure. The material of the body and the type of the point defect are not limited as long as the point defect center can be used as a single-photon light source. When materials that can be used as the material of the body are descried, the material of the body refers to a material having a relatively wide energy bandgap of 3 eV or more and may include diamond (5.5 eV), SiC (3.2 eV), GaN (3.45 eV), ZnO (3.3 eV), and the like. Meanwhile, the types of point defects that can be used as a single-photon light source include silicon vacancies or nitrogen vacancies in diamond, silicon vacancies in SiC, and the like, and there are numerous defects depending on the type of a solid. The inverted nanocone structure is universally applicable to these defects.

The most preferred material for the body is diamond, and the most preferred type of the point defect is a nitrogen vacancy. For convenience of description, hereinafter, the diamond body and the nitrogen vacancy are described as examples in the detailed description, but it is obvious that the above-described body materials and point defects may be applied.

When nitrogen vacancies are injected into diamond, nitrogen ions are injected into an inverted nanocone structure and activated by performing an annealing process, and some thereof may perform the role of a nitrogen-vacancy center.

It is confirmed that when the inverted nanocone structure is used for a single-photon light source, the brightness of the light source may be greatly improved due to the effect in which the structure capable of trapping most light generated from the nitrogen-vacancy center light source is possible due to the inverted nanocone structure.

An ideal single-photon source may be realized using spontaneous emission from a nitrogen-vacancy center in diamond, and most light generated from a center light source may be trapped by applying an inverted nanocone structure of the diamond to the single-photon source that uses the nitrogen-vacancy center.

It is possible to increase light trapping efficiency by adjusting the size of the inverted nanocone structure according to the refractive index of a material and the wavelength of a single-photon light source. Thus, the inverted nanocone structure may be used to brighten a single-photon light source existing in a body material, such as silicon carbide, or other point defects in diamond, such as a silicon vacancy (SiV).

In one method of producing inverted nanocone structures, a method of dry etching a diamond surface in an oblique direction using a Faraday cage may be used. When the region in which the inverted nanocone structure is connected to a diamond substrate is minimized, loss in a direction of the substrate may be reduced, and trapping efficiency may be increased. The present inventors have measured a spin coherence time of the nitrogen-vacancy center in the inverted nanocone structure and confirmed that the influence due to the production of the inverted nanocone structure does not occur. This will be described below.

It will also be described that a diamond cone structure may be moved to a desired position using the pick and place technique in a scanning electron microscope (SEM). These results suggest the possibility of using an atomic defect center of a solid to realize a high-efficiency single-photon source as well as to integrate a high-quality diamond single-photon source into a quantum application system.

Referring to FIG. 1B, in the inverted nanocone structure, a diameter of the first surface 100 is "a," a diameter of the second surface 200 is "b," an angle formed by the body 300 and the first surface 100 is "θ," and the position of the point defect exists at a distance of "c" from a lower surface.

The following example is one embodiment, and the scope of the present disclosure is not limited thereto. The size of the inverted nanocone structure may be changed depending on the wavelength of a single-photon light source and the material of the inverted nanocone structure.

In order to increase the trapping efficiency of a light source that emits light having a wavelength of 600 nm, the diameter "a" of the first surface 100 is preferably in a range of 20 nm to 100 nm. When the diameter is less than 20 nm, the contact area with a substrate below the inverted nanocone structure becomes too small, which increases the risk of breakage of the inverted nanocone structure during the process, and when the diameter is greater than 100 nm, extraction efficiency is lowered. Meanwhile, the present inventors have found that a more preferred range for the diameter is between 40 nm and 60 nm. In particular, when the diameter "a" of the first surface 100 is a value near 50 nm, there is little risk of breakage in the process, and considering that the smaller the diameter, the better the extraction efficiency, the optimum value of the diameter "a" of the first surface 100 is around 50 nm. A length of the inverted nanocone structure is preferably in a range of 500 nm to 2000 nm. When the length is less than 500 nm, the length of the cone structure becomes less than the wavelength of light so that light emission from the light source is suppressed and the brightness of the light source is reduced. When the length is greater than 2000 nm, the risk of breakage of the inverted nanocone structure during the process increases. A diameter of a top surface is limited to 300 nm to 600 nm in which a single-mode wavelength may be generated at the light source. This is to simplify the mode of light being emitted. "θ" is determined by the diameters of upper and lower portions and the length of the cone structure. Preferably, it is effective to maintain the angle to be as steep as possible ("θ" is decreased) while maintaining the desired range of the diameter of a bottom surface. Referring to FIG. 2B, it can be seen that "θ" has a peak in the upper 70's. Thus, "θ" is preferably in a range of about 75° to 85°, and the power may be reduced to reduce the effect when "θ" is too great, and a process problem may occur when "θ" is too small. Meanwhile, referring to FIG. 2B, the most effective "θ" may be in a range of about 77° to 81°, which is "θ" corresponding to 70% power.

A nitrogen vacancy is created at a position at which light reflected from the contact surface between the cone structure and the substrate may constructively interfere with light emitted upward.

(Simulation)

Figure 2A:
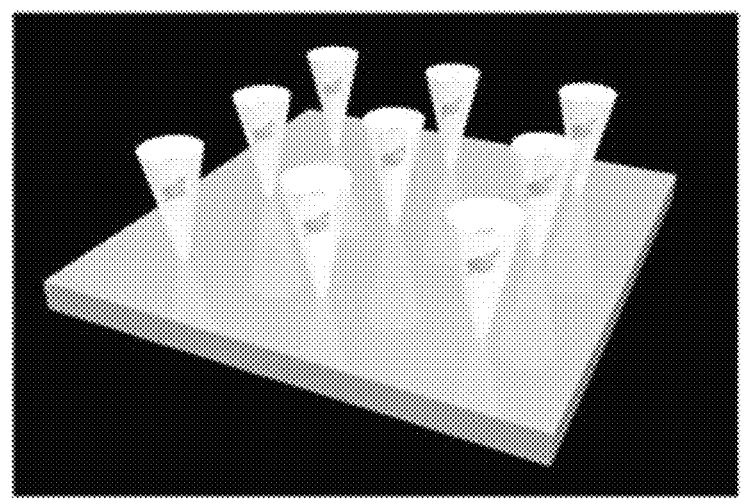
FIG. 2A is a schematic diagram illustrating a situation in which inverted nanocone structures according to an embodiment of the present disclosure are formed.
Figure 2B:
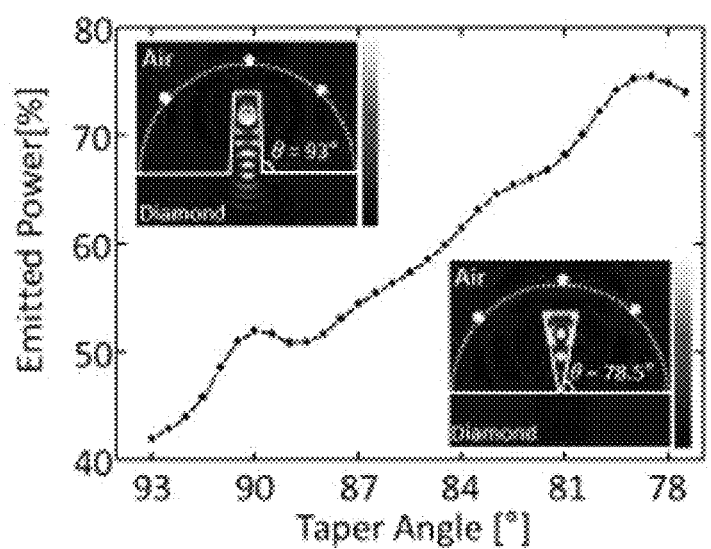
FIG. 2B is a graph illustrating a result of simulating a correlation between an angle of the inverted nanocone structure and a ratio of power emitted out of diamond conducted using three-dimensional (3D) finite-difference time-domain (FDTD) simulation software (Lumerical Solutions Ltd.)

FIG. 2A is a schematic diagram illustrating a situation in which inverted nanocone structures according to the embodiment of the present disclosure are created, and FIG. 2B is a graph illustrating a result of simulating a correlation between an angle of the inverted nanocone structure and a ratio of power emitted out of diamond conducted using a three-dimensional (3D) finite-difference time-domain (FDTD) simulation software (Lumerical Solutions Ltd.).

This is the case of a diamond body and a nitrogen-vacancy center. In an inverted nanocone structure, a relatively very small area is in contact with a diamond substrate.

The wavelength of the light source, the depth of the light source, and the diameter of the cone at the depth of the light source were fixed at 637 nm, 300 nm, and 350 nm, respectively. In general, diamond is a physically and chemically stable material, and a diamond nano-pillar structure produced by the conventional dry etching technique has a slightly oblique angle of about 93° to 95°. In this case, as shown in the simulation result, the ratio of the power emitted out of the diamond to the power of the light source inside the inverted nanocone structure is about 45 to 50%. This is because the light emitted from the source toward the diamond substrate cannot be trapped.

However, as the tilt angle of the structure decreases, a greater proportion of light is emitted from the diamond structure. When the angle of a pillar decreases to 78.5°, an inverted nanocone structure is achieved.

Here, the diameter of the contact area between the inverted nanocone structure and the diamond substrate is less than 50 nm, and here, optical loss in a substrate direction may be reduced since there is no mode for guiding the light in the direction of the diamond substrate. In such a structure, more than 80% of the light emitted from the light source may be theoretically extracted.

Next, the ratio of the light emitted from the diamond was simulated with the trapping efficiency according to the position of the light source in the inverted nanocone structure.

Figure 3A:
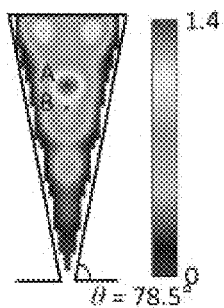
FIG. 3A is a view illustrating power emitted to the outside of a diamond surface according to the position of a light source in the inverted nanocone structure.
Figure 3B:
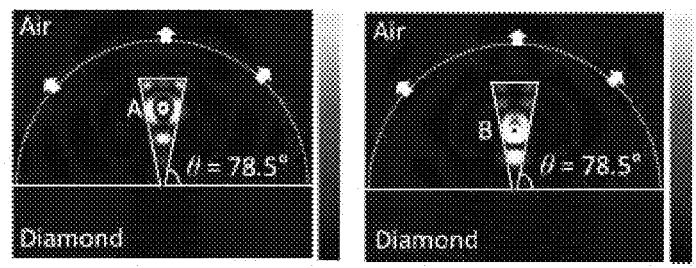
FIG. 3B is a view illustrating a power field profile when the depth of the light source is changed to positions "A" and "B" in FIG. 3A.
Figure 3C:
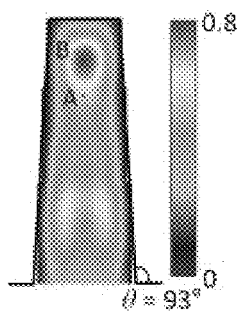
FIG. 3C is a view illustrating power emitted to the outside of a diamond surface according to the position of a light source in the nanopillar structure.
Figure 3D:
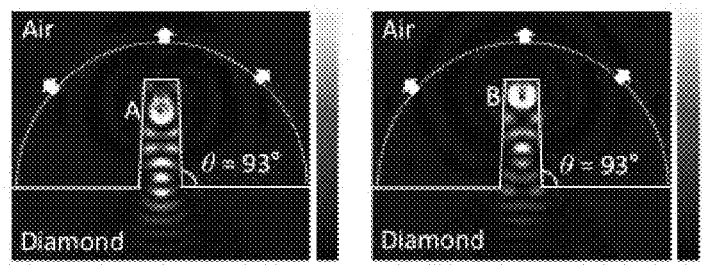
FIG. 3D is a view illustrating a power field profile when the depth of the light source is changed to positions "A" and "B" in FIG. 3C.

FIG. 3A is a view illustrating the power emitted to the outside of a diamond surface according to the position of the light source in the inverted nanocone structure, and FIG. 3B is a view illustrating a power field profile when the depth of the light source is changed to positions "A" and "B" in the drawing. Here, A=300 nm, and B=450 nm.

The calculation result confirmed that the trapping efficiency was the highest when the light source was at the depth of 300 nm and was in the center portion of the structure, and the trapping efficiency was twenty times higher than that of the case having no structure and two times higher than that of a diamond pillar. In addition, a relatively great amount of light can be trapped even when a numerical aperture (NA) is low.

When nitrogen-vacancy centers are created using an ion implantation method, the position of the nitrogen-vacancy center in the inverted nanocone structure may be random. Accordingly, it is necessary to confirm the ratio of the light extracted from the outside of the diamond according to the position of the nitrogen-vacancy center. As shown in FIG. 3B, the amount of light emitted from the inverted nanocone structure with an angle of 78.5° was simulated. FIG. 3A shows the rate of the power emitted from the diamond surface for each position of the light source. The calculation result is normalized to the total power emitted from the nitrogen-vacancy center inside a diamond bulk. When the light source was at the depth of 300 nm, the greatest amount of light was emitted from the diamond. The reason that the result is greater than "1" is due to the Purcell effect due to the confinement of light in a cone structure. According to the simulation, the Purcell effect of the cone is about 1.8, and 80% of the light may be trapped. FIG. 3B is a radiation pattern of the light according to the position of the light source. It can be seen that when the depth of the light source is 300 nm, the amount of light lost in a bulk direction is less than in the case that the depth of the light source is 400 nm.

Figure 4:
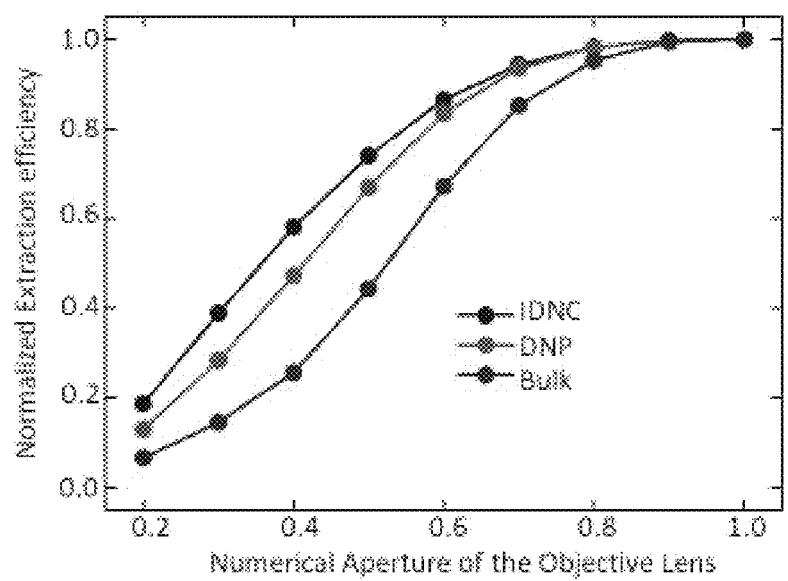
FIG. 4 illustrates a simulation result of the degree of change in trapping efficiency according to the numerical aperture of an objective lens of each of an diamond inverted nanocone structure (represented by DINC), a general bulk structure (represented by Bulk), and a nanopillar structure (represented by DNP)

Next, the ratio of the light emitted from the diamond was simulated with the trapping efficiency according to NA of an objective lens in the inverted nanocone structure. FIG. 4 illustrates a simulation result of the degree of change in trapping efficiency according to the NA of the objective lens of each of an diamond inverted nanocone structure (represented by DINC), a general bulk structure (represented by Bulk), and a nanopillar structure (represented by DNP). The trapping efficiency calculated for the various NA of the objective lens was normalized such that the NA of each of the inverted nanocone structure, the general bulk structure, and the nanopillar structure was one.

When the nanostructure was used, high trapping efficiency could be achieved even in the objective lens having a low NA. As can be seen from FIG. 4, the inverted nanocone structure has a higher trapping efficiency than the nanopillar. In the present simulation, almost all of the light emitted from the inverted nanocone structure could be trapped using the objective lens of NA 0.9.

Next, a method of producing the inverted nanocone structure of the present disclosure will be described.

Figure 5A:
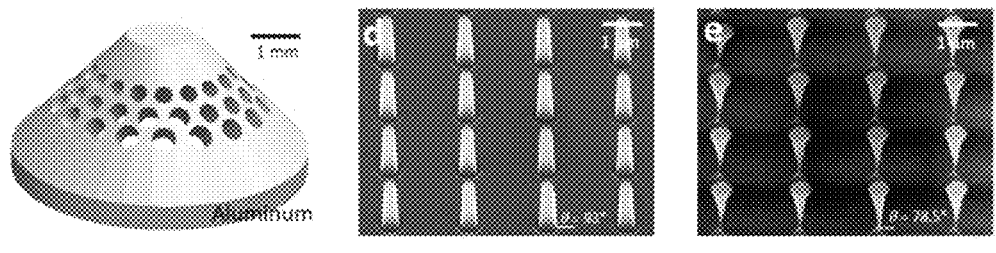
FIGS. 5A and 5B are views illustrating an inverted nanocone structure producing mask for producing the inverted nanocone structure according to one embodiment of the present disclosure.
Figure 5B:
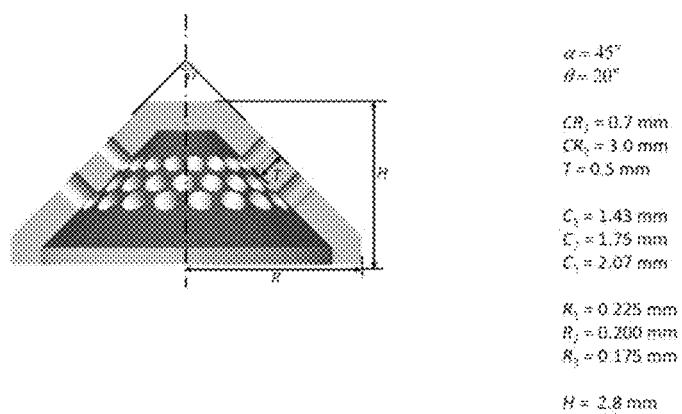

FIGS. 5A and 5B are views illustrating an inverted nanocone structure producing mask for producing the inverted nanocone structure according to one embodiment of the present disclosure.

Referring to FIG. 5A, the mask includes a lower open part 600 at a bottom thereof, has a cone shape of a predetermined thickness in which the lower open part 600 has a greater area than an upper part 500, and includes a perimeter having at least two rows of hole arrays 700 in which holes are arranged. The sizes of the holes may be the same or different. In addition, the upper part has a flat region having a predetermined area but has a closed structure.

Referring to FIG. 5B, a material is aluminum, a height H is 2.8 mm, an angle α is 45°, a radius R of the bottom is 3 mm, and a shell thickness T is 0.5 mm. The present inventors produced the structure by performing micro milling, and thus the present inventors could produce a more precise structure than the case in which a conventional handmade cage using an aluminum mesh is used. In dry etching, the diamond is disposed in the central portion of a cage bottom.

Next, a method of producing the inverted nanocone structure according to the embodiment of the present disclosure will be described. FIGS. 6A to 6E are a view for describing a flowchart of a method of producing the inverted nanocone structure according to the embodiment of the present disclosure. A method of producing nitrogen-vacancy centers in a diamond material will be described as an example.

First, a diamond plate is prepared. When necessary, diamond containing a predetermined concentration of nitrogen may be prepared and utilized in the production of nitrogen-vacancy centers for producing a single-photon source.

Figure 6A:
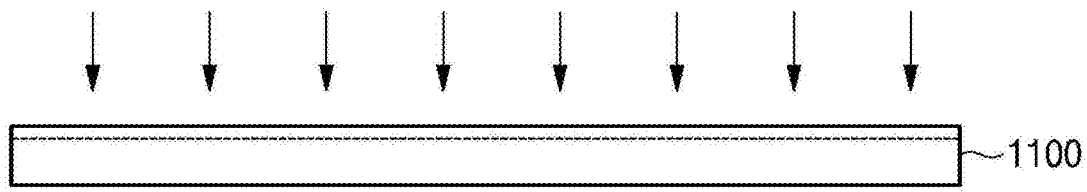
FIGS. 6A to 6E are a flowchart of a method of producing the inverted nanocone structure according to an embodiment of the present disclosure.
Figure 6B:
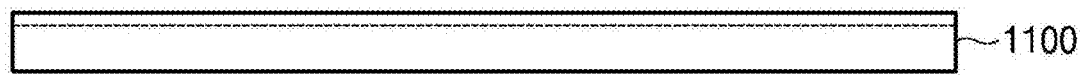

Next, nitrogen ions are implanted into the diamond plate (FIG. 6A). For example, nitrogen molecular ions (14N+) are implanted into the diamond, in which inverted nanocone structures are created, with an energy of 200 to 500 keV and a density of 0.2 to $8.0 \times 10^{10}/cm^2$. Subsequently, the diamond is annealed in a substantially vacuum state to activate the nitrogen-vacancy centers (FIG. 6B). For example, the diamond is annealed at 600 to 1300° C. for 2 to 12 hours in a high vacuum ($<2 \times 10^{-7}$ Torr) to activate the nitrogen-vacancy centers.

Figure 6C:
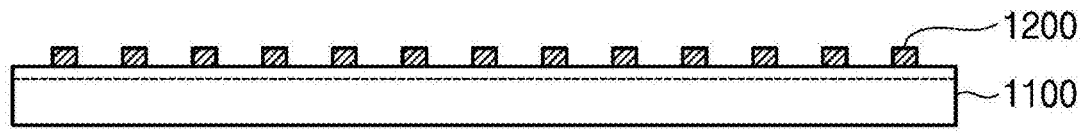

Next, a circular etch mask is patterned using silicon nitride (SiN) (FIG. 6C). The etch mask is used to form the inverted nanocone structures. SiN may be well-resistant to oxygen plasma and may be easily removed with a hydrogen fluoride (HF) solution and thus is effective as an etch mask for performing dry etching on the diamond.

Figure 6D:
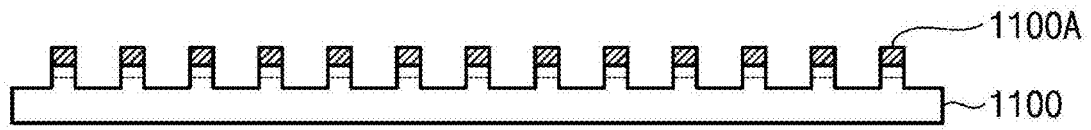
Figure 6E:
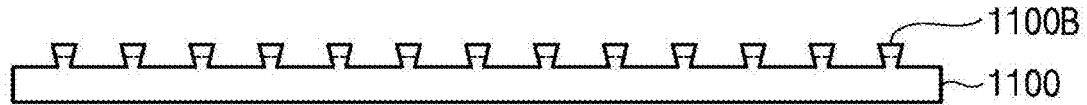

Next, the etching process for producing the inverted nanocone structures is performed in two operations. In a first operation, anisotropic etching is performed using a silicon nitride mask (FIG. 6D). A nanopillar array is formed by performing the etching process. Next, in a second etching process, anisotropic dry etching or quasi-isotropic dry etching is performed on the diamond in an oblique direction using a Faraday cage in FIG. 5A. After the dry etching is completed, the silicon nitride etch mask is removed (FIG. 6E). An inverted nanocone array formed on the diamond plate may be produced by performing these operations.

Experimental Example

In order to produce a single-photon source, a high-purity chemical vapor deposition (CVD) diamond plate, which has a thickness of 500 µm and contains nitrogen with a concentration of <5 ppb, was used. Nitrogen molecular ions ($^{28}N_2^+$) were implanted into the diamond, in which inverted nanocone structures were to be created, with an energy of 340 keV and a density of $2.0 \times 10^{10}/cm^2$ and were implanted into the control diamond with the same energy and density of $2.0 \times 10^9/cm^2$ in order to measure the trapping efficiency of nitrogen-vacancy centers in a diamond bulk.

The average depth of the nitrogen molecular ions implanted at 340 keV was about 300 nm according to the calculation result of the stopping and range of ions in matter (SRIM, www.srim.org) simulations. The diamond is annealed at 600 to 1300° C. for 2 to 12 hours in a high vacuum ($<2 \times 10^{-7}$ Torr) to activate the nitrogen-vacancy centers. Subsequently, the diamond was washed in a mixed acid, including 95% sulfuric acid, 60% nitric acid, and 70% perchloric acid at a ratio of 1:1:1, for 1 hour at 170° C. in order to remove graphite and other surface contaminants on a diamond surface. Assuming that the production rate of the nitrogen-vacancy (NV) centers with respect to the implanted nitrogen (N) ions is approximately 5%, an NV center layer with a density of 10 NV centers/$\mu m^2$ at a depth of 200 nm was created in the CVD diamond plate used by the present inventors. The area of the NV center layer for the inverted nanocone structures to be produced was 0.07 $\mu m^2$ so that the inverted nanocone structures including NV centers could be found with a probability of approximately 70%.

When anisotropic etching or quasi-isotropic etching is performed in diamond in an oblique direction using a Faraday cage, a structure inclined in a reverse direction may be produced in the diamond.

In one example, the diamond was dry etched in an oblique direction. A Faraday cage allows the potential gradient of plasma inside the etching device to be generated to be parallel to a cage surface. The plasma etch ions were accelerated along a path perpendicular to the cage surface. In order to etch all directions simultaneously, a conical Faraday cage was used. Aluminum pieces were finely processed to fabricate the Faraday cage.

Silicon nitride (SiN) may be well-resistant to oxygen plasma and may be easily removed with an HF solution and thus was used as an etch mask for performing dry etching on the diamond. A circular cylinder pattern with a diameter of 600 to 640 nm was formed on a SiN thin film with a thickness of 350 nm, which was deposited using high-density plasma chemical vapor deposition, by performing electron beam lithography (a first beam energy of 80 keV and a density of 1000 $\mu C/cm^2$). The resist used was negative resist (AR-N 7520.18, Allresist GmbH), and the thickness of the resist was about 500 to 600 nm. After performing the lithography, the pattern was developed in an AR 300-47 (TMAH based) solution at 22° C. for 80 seconds.

The SiN hard mask was etched at 100 W of RF power, $SF_6$ flow rate of 40 sccm, $O_2$ flow rate of 5 sccm, and 7 mTorr of pressure atmosphere using an RIE-100 ICP etcher (Oxford Instruments Inc.) to transfer the pattern onto the resist. The diamond etching for creating the inverted nanocone structures was performed in two processes in the equipment of an STS multiplex inductively coupled plasma (ICP) system. First, a vertical etching process for controlling the height of the structures was performed on the diamond at ICP power of 700 W, a bias power of 50 W, $O_2$ of 45 sccm, $Cl_2$ of 5 sccm, and a chamber pressure of 10 mTorr. A thickness of an etched diamond pillar was 500 nm.

Subsequently, the sample was placed in a conical Faraday cage to perform an etching process under the same conditions as the first process. After performing the etching, the remaining SiN hard mask was removed with an HF solution. Finally, heat treatment was performed at 1100° C. for 2 hours in a high vacuum ($<2 \times 10^{-7}$ Torr) to remove the strain on the diamond surface. The SEM image of the completed structures is illustrated in FIG. 1D. A height of the structure was 1100 nm, and diameters of an upper end and a lower end were 550 nm and 50 nm, respectively. A taper angle of the structure was 78.5° which is the same as the previously designed structure. Diamond in a nano scale may be bent and stretched elastically like rubber, but the diamond structure, having an inverted nanocone structure, produced in this process did not collapse during wet cleaning even though the diameter was less than 50 nm in diameter. For reference, it is known that nano-scale single crystal diamond may be elastically deformed and may be destroyed at a tensile stress of 89 to 98 GPa.

In order to confirm the effect of the inverted nanocone structure, nanopillar structures were also produced on the other diamond having nitrogen-vacancy centers. The production process was the same as the process of producing the inverted nanocone structure except for the oblique dry etching process. A taper angle of a pillar was about 93°. A height of a pillar was 1300 nm, and a diameter of an upper end was 300 nm.

(Measurement)

Figure 7A:
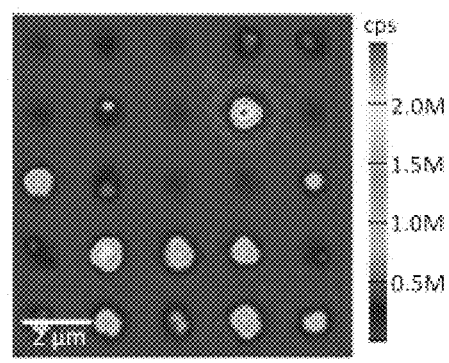
FIG. 7A is a confocal microscope inspection image of an inverted nanocone array.
Figure 7B:
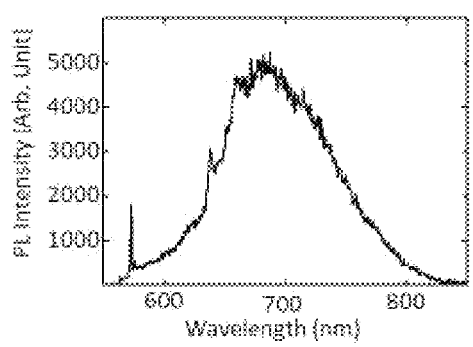
FIG. 7B illustrates a light emission spectrum of a single nitrogen-vacancy (NV) center in the inverted nanocone structure.
Figure 7C:
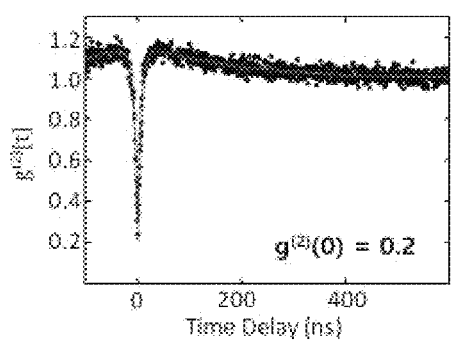
FIG. 7C illustrates a second-order autocorrelation function of the NV center in the inverted nanocone structure representing a single-photon source.
Figure 7D:
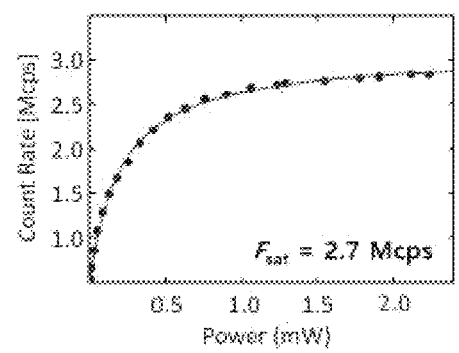
FIG. 7D is a power-dependent fluorescence saturation curve of a single NV in the inverted nanocone structure.

FIG. 7A is an inverted nanocone array image (10×10 $\mu m^2$) at a confocal microscope inspection, FIG. 7B illustrates a light emission spectrum (red circle in FIG. 7A) of a single nitrogen-vacancy center in the inverted nanocone structure showing a zero-phonon line (ZPL) of the nitrogen-vacancy center at 637.8 nm, FIG. 7C illustrates a second-order autocorrelation function of the nitrogen-vacancy center in the inverted nanocone structure representing a single-photon source with $g_{(2)}(0)=0.2$, and FIG. 7D is a power dependent fluorescence saturation curve of a single nitrogen vacancy in the inverted nanocone structure.

The number of photons emitted per second in the single-photon source with the inverted nanocone structure was measured using a confocal microscope system. An objective lens of NA 0.95 was used for trapping photons. FIG. 7A is a confocal image of the inverted nanocone array. As can be seen from the image, the structures were created with 2 µm intervals and the number of photons emitted from the structure was greater than that in the background. The inverted nanocone structure emits a single photon at a rate of 1 to 2.5 Mcps at an input power of 0.3 mW. As can be seen from the above calculation results, a photon emission rate varies according to the degree of coupling efficiency between the NV center and the structure. Light is being emitted even in the inverted nanocone structure having no NV center, and this is because noise is also trapped in one side.

The light emission spectrum of the nitrogen-vacancy center was measured at the nitrogen-vacancy center of an DINC_A (in a red circle of FIG. 7A) (FIG. 7B). A ZPL was confirmed at 637 nm in the spectrum, and a similar type of spectrum was confirmed in all cone structures having an NV center. FIG. 7C illustrates a second-order autocorrelation function of the NV center in the DINC_A. The second-order autocorrelation result could be fitted with an equation in the form of $g_{(2)}(\tau)=1-(1-g_{(2)}(0))\exp(-|\tau|/\tau 0)$. An anti-bunching dip value was 0.2. Since the value of $g_{(2)}(0)$ was less than 0.5, it could be confirmed that there was a single-photon light source, in which only one NV center exists, in the inverted nanocone structure. A saturated count rate was 2.7 Mcps (FIG. 7D). This is the highest value among single-photon sources using a single crystal diamond waveguide (or filler or nanowire) structure.

Figure 8:
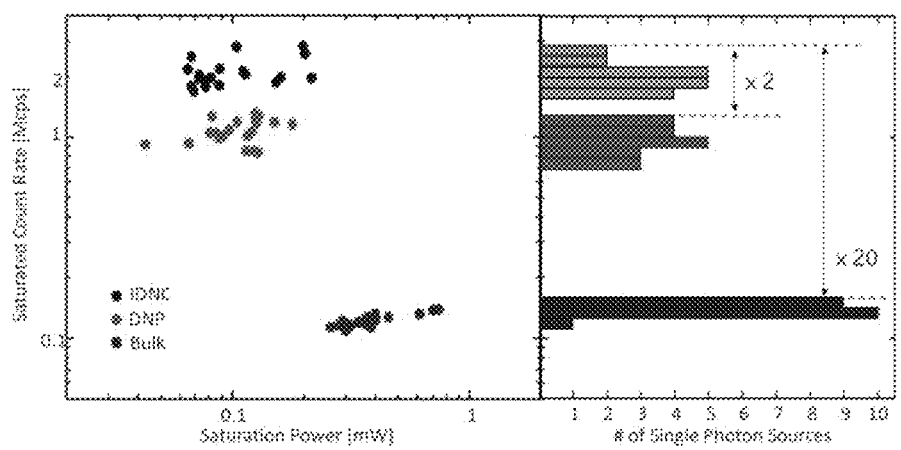
FIG. 8 is a graph illustrating saturated count rates and saturation power for NV centers of 20 DINCs (black circles), 20 DNPs (red circles), and 20 Bulks (blue circles) in the inverted nanocone structure and illustrates data that statistically compares the NV centers of the DINC, the DNP, and the Bulk.

FIG. 8 is a graph illustrating saturated count rates and saturation power for nitrogen-vacancy centers of 20 DINCs (black circles), 20 DNPs (red circles), and 20 Bulks (blue circles), and illustrates data that statistically compares the NV centers of the DINC, the DNP, and the Bulk. The dashed line represents a median.

As shown in FIG. 8, the count rate at which 20 bright NV centers were saturated in each of the diamond inverted nanocone structures (represented by DINC) and nanopillar structures (represented by DNP) was measured. The inverted nanocone structure was saturated at an input power similar to that of the nanopillar structure, but the saturated count rate of the emitted photons was two times greater than that of the nanopillar structure (DNP). The highest value of the saturated count rate in the DINCs was 2.7 Mcps and the highest value of the saturated count rate in the DNPs was 1.4 Mcps. In order to clearly confirm the effect of the inverted nanocone structure, the number of saturated single photons in 20 NV centers of an unstructured diamond bulk was checked. The average saturated count rate was 0.13 Mcps. That is, the number of single photons trapped per hour may be increased by 20 times when an inverted nanocone structure is introduced. Considering that the trapping efficiency in the bulk was about 4%, it was possible to trap about 80% of single photons in the nitrogen-vacancy center in the case of the inverted nanocone structure, which was consistent with the previous simulation result.

Figure 9A:
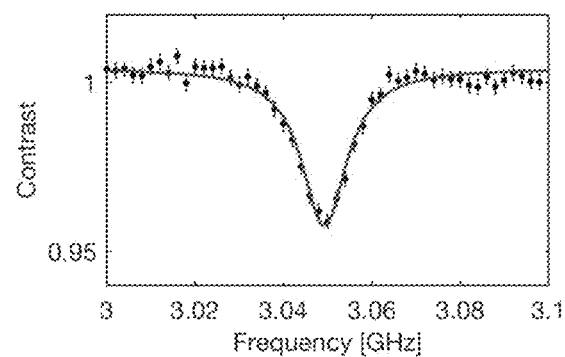
FIG. 9A is a graph illustrating an optically detected magnetic resonance (ODMR) spectrum for NV spin inside the inverted nanocone structure.
Figure 9B:
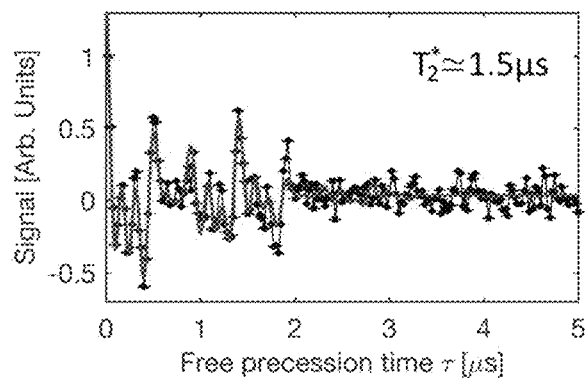
FIG. 9B is a graph illustrating free induction decay (FID) measured using a Ramsey pulse sequence.
Figure 9C:
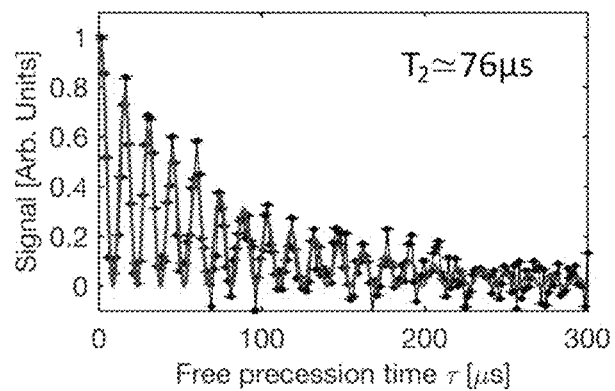
FIG. 9C is a graph illustrating dephasing time measured using a Hahn echo pulse sequence.
Figure 9D:
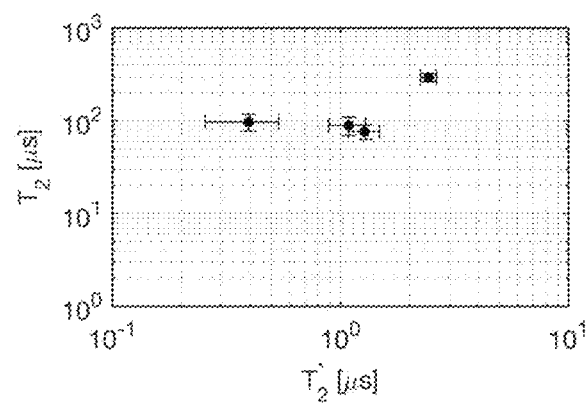
FIG. 9D is a graph illustrating spin coherence time measured in four different inverted nanocone structures.

FIG. 9A is a graph illustrating an optically detected magnetic resonance (ODMR) spectrum for NV spin inside the inverted nanocone structure with a photon emission rate of 2.7 Mpcs, where a single dip represents a resonant frequency between $m_s=0$ and $m_s=+1$. FIG. 9B is a graph illustrating free induction decay (FID) measured using a Ramsey pulse sequence at $T2^*=1.5+0.2$ μs, FIG. 9C is a graph illustrating dephasing time measured using a Hahn echo pulse sequence at $T2=76+13$ μs, and FIG. 9D is a graph illustrating spin coherence time measured in four different inverted nanocone structures.

The spin coherence time of the NV inside the inverted nanocone structure was measured. FIG. 9A illustrates the ODMR spectrum having continuous optical and microwave fields. A bias magnetic field of 64 GHz was applied to split the energy level between $m_s=+1$ and $m_s=-1$. A Ramsey interferometry pulse sequence was used to measure the NV at $T2^*=1.5+0.2$ μs. The applied microwave frequency was adjusted up to 3 MHz and a beating signal due to ultra-fine segmentation from nitrogen atom ($^{14}$N) nuclear spin was observed. A Hahn echo pulse sequence was used to measure a decoherence time T2 of the NV center. The measured T2 was 76±13 μs. It was analyzed that a sudden decrease and increase in a spin-echo signal was due to the influence of intrinsic $^{13}$C isotope nuclear spins around the NV center spin. The extracted bias magnetic field at the increasing time point was 68±4 GHz split from $^{13}$C nuclear gyromagnetic ratio, which was consistent with the measurement in the ODMR spectrum. Finally, the present inventors measured the spin coherence time of the NV center at four different DINCs having a photon emission rate of 1 Mcps or more. Although the geometry of the DINCs was 300 nm or less, most of the NV center spin was shown as $T2^*>1$ μs and $T2>80$ μs. The spin measurement confirmed that a transferable bright single-photon structure has excellent spin cohesive time which is superior to that of a typical nanostructured diamond.

Figure 10A:
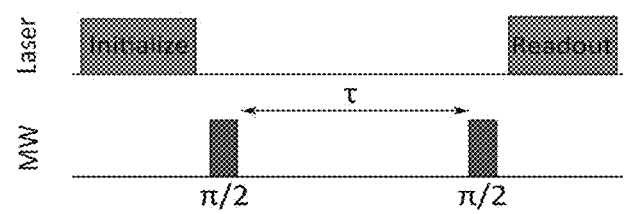
FIGS. 10A and 10B are a set of views for describing a method of measuring spin coherence time at an NV center.
Figure 10B:
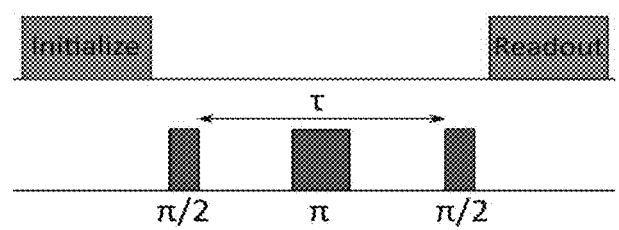

FIGS. 10A and 10B are a view for describing a method of measuring spin coherence time at the NV center.

FIG. 10A is a Ramsey pulse sequence for measuring FID. First, the NV spin was initialized, $m_s=0$, by irradiating green laser of 532 nm. Then, in the resonance between $m_s=0$ and $m_s=+1$, a microwave having a frequency of 3 MHz is applied to the NV spin at every $\pi/2$. The final NV spin state was read through an additional green laser pulse. The measurement data of FIG. 9B is well suited to a theoretical function. FIG. 10B illustrates a Hahn echo pulse sequence for measuring T2. The measurement data of FIG. 9C is well suited to a theoretical function.

(Application of Inverted Nanocone Structure)

The inverted nanocone structure of the present disclosure may be widely applied to optical devices. As an example, a solid-state single-photon source may be utilized, and here, it may be effective to integrate the source with another device. In the case of quantum dots and 2-D materials, there is a need for a method of transferring the source to another functional optical device. However, in the case of diamond, it may be difficult to move the structure because the diamond is very hard. However, the present inventors have found that the inverted nanocone structure of the present disclosure may be easily separated by an external force because the radius of a bottom of the structure is very small.

Figure 11A:
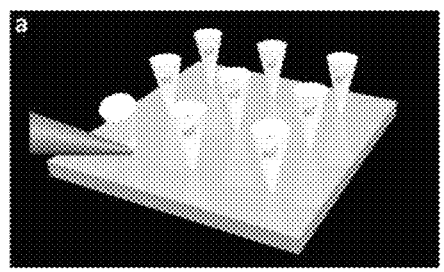
FIG. 11A is a view schematically illustrating an operation process using a micro-probe tip to transfer the inverted nanocone structure of the present disclosure.
Figure 11B:
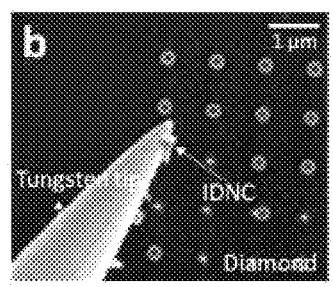
FIG. 11B is a view illustrating an operation of selecting the inverted nanocone structure with the micro-probe tip in a diamond bulk.
Figure 11C:
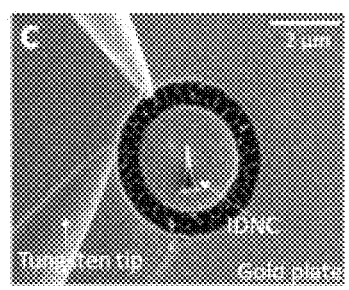
FIG. 11C illustrates a scanning electron microscope (SEM) image after moving the inverted nanocone structure to a gold plate that is a target.

FIG. 11A is a view schematically illustrating an operation process using a micro-probe tip to transfer the inverted nanocone structure of the present disclosure, FIG. 11B is a view illustrating an operation of selecting the inverted nanocone structure with the micro-probe tip in a diamond bulk, and FIG. 11C illustrates an SEM image after moving the inverted nanocone structure to a gold plate that is a target.

The present inventors have moved the inverted nanocone structure to another position. The present inventors used the pick and place technique in an SEM. The present inventors separated the inverted nanocone structure using a tungsten micro-probe tip with van der Waals force (FIG. 11B) and could easily place the inverted nanocone structure on the gold plate target with two tungsten tips (FIG. 11C).

In order to control a single emission direction, directions of the inverted nanocone structures may be controlled. In this manner, inverted nanocone structures having excellent optical and quantum properties may be selectively integrated with functional optical devices, such as a waveguide and an optical resonator.

Figure 12:
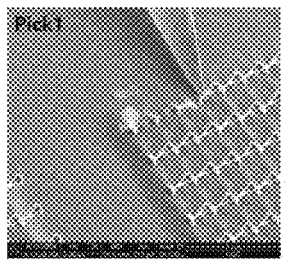
FIG. 12 is a set of views illustrating a fabrication example of an optical device using inverted nanocone structures.
Figure 12:
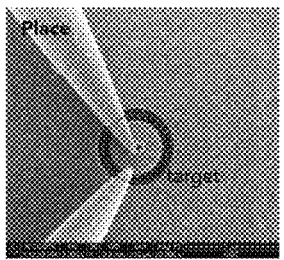
Figure 12:
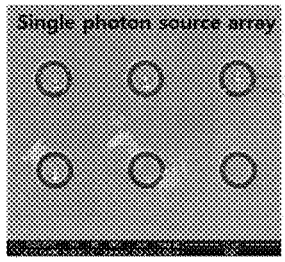
Figure 12:
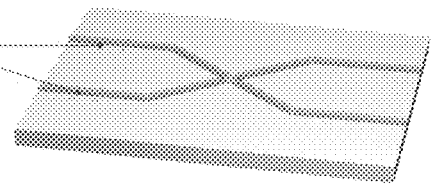

Next, FIG. 12 is a set of views illustrating a fabrication example of an optical device using inverted nanocone structures.

Referring to FIG. 12, FIG. 12 shows that the produced structures may be selectively transferred to another place using the pick and place technique. It is expected that the structure of the present disclosure may also be used for quantum sensing as well as light sources for quantum integrated circuits. The structure is applicable to measuring the nano-scale magnetic field by creating a nitrogen vacancy close to a contact part of the cone structure and attaching an upper part to the other part to be used as a tip of a cantilever. In addition, the structure may also be used for measurements such as analysis of flow rate according to the degree of bending of the cone structure by utilizing the high elasticity property of nano-sized diamond, which has been recently noted. The structure is also applicable to controlling the characteristics of light emitted from defects since the strain value of the defects changes according to the degree of bending of the cone structure.

The proposed structure is expected to be widely used to improve the efficiency of a variety of applications including photons because the structure may also be applied to other single-photon emitters such as other point defects of diamond and defect-related color centers of silicon carbide.

Although the embodiments of the present specification have been described with reference to the accompanying drawings, it should be understood by those skilled in the art that the present disclosure may be implemented in other detailed forms without departing from the technical spirit or the necessary features of the present disclosure. Therefore, it should be understood that the above embodiments are illustrative rather than restrictive in all respects.

What is claimed is:

1. A method of producing an inverted nanocone structure, the method comprising:
   preparing a base material;
   forming a nitrogen vacancy by injecting nitrogen ions into the base material and annealing the base material;
   forming a nanostructure having a cylindrical shape by patterning a mask in a circular shape and using an anisotropic etching process; and
   forming an inverted nanocone structure by etching a first surface of the cylindrical shape, which is in contact with the base material, more than a second surface, which is an upper portion of the cylindrical shape;
   wherein, in the forming of the inverted nanocone structure, dry etching is performed using a Faraday cage for producing an inverted nanocone structure, and
   wherein the Faraday cage has:
   an upper open part and a lower open part disposed on an upper portion and a lower portion thereof, respectively;
   a cone shape, in which the lower open part has a greater area than the upper open part, with a predetermined thickness; and
   a perimeter in which a number of holes are arranged.

2. The method of claim 1, further comprising selecting an inverted nanocone structure in which at least one activated nitrogen vacancy exists in the inverted nanocone structure.

3. The method of claim 1, wherein a material (energy bandgap) of the base material includes diamond (5.5 eV), SiC (3.2 eV), GaN (3.45 eV), or ZnO (3.3 eV).

4. The method of claim 1, further comprising selecting an inverted nanocone structure in which at least one activated flail silicon vacancy exists in the SiC inverted nanocone structure.

5. The method of claim 1, further comprising separating the produced inverted nanocone structure from the diamond base material and disposing the inverted nanocone structure in an optical element structure.

* * * * *